April 16, 1940.  S. S. COOK ET AL  2,197,070

TORQUE TRANSMITTING MECHANICAL COUPLING

Filed Nov. 16, 1938

INVENTORS
Stanley Smith Cook
and Louis Mortimer Douglas
BY
ATTORNEYS

Patented Apr. 16, 1940

2,197,070

UNITED STATES PATENT OFFICE 2,197,070

TORQUE TRANSMITTING MECHANICAL COUPLING

Stanley Smith Cook and Louis Mortimer Douglas, Wallsend-on-Tyne, England, assignors to The Parsons Marine Steam Turbine Company, Limited, Wallsend-on-Tyne, England Application November 16, 1938, Serial No. 240,624
In Great Britain November 22, 1937

1 Claim. (Cl. 64—9)

The invention relates to torque transmitting mechanical couplings connecting a driving with a driven element and has as its main object to provide a coupling capable of transmitting a considerable torque whilst allowing for a certain degree of want of alignment between driving and driven elements in addition to freedom of relative axial movement, the coupling also being capable of ready assembly and dismantling.

The present invention consists in a mechanical coupling comprising an open ended driving member, a set of projections thereon, an open ended driven member, a set of projections thereon disposed in a plane at right angles to the plane containing the other set, said driving members and driven members being mutually interdisposed, an encircling member for said driving and driven members, internal grooves on said encircling member co-acting with said sets of projections and ties between the open ends of said driving and driven members.

Referring to the accompanying diagrammatic drawing.

Figures 1, 2, 3, 4:
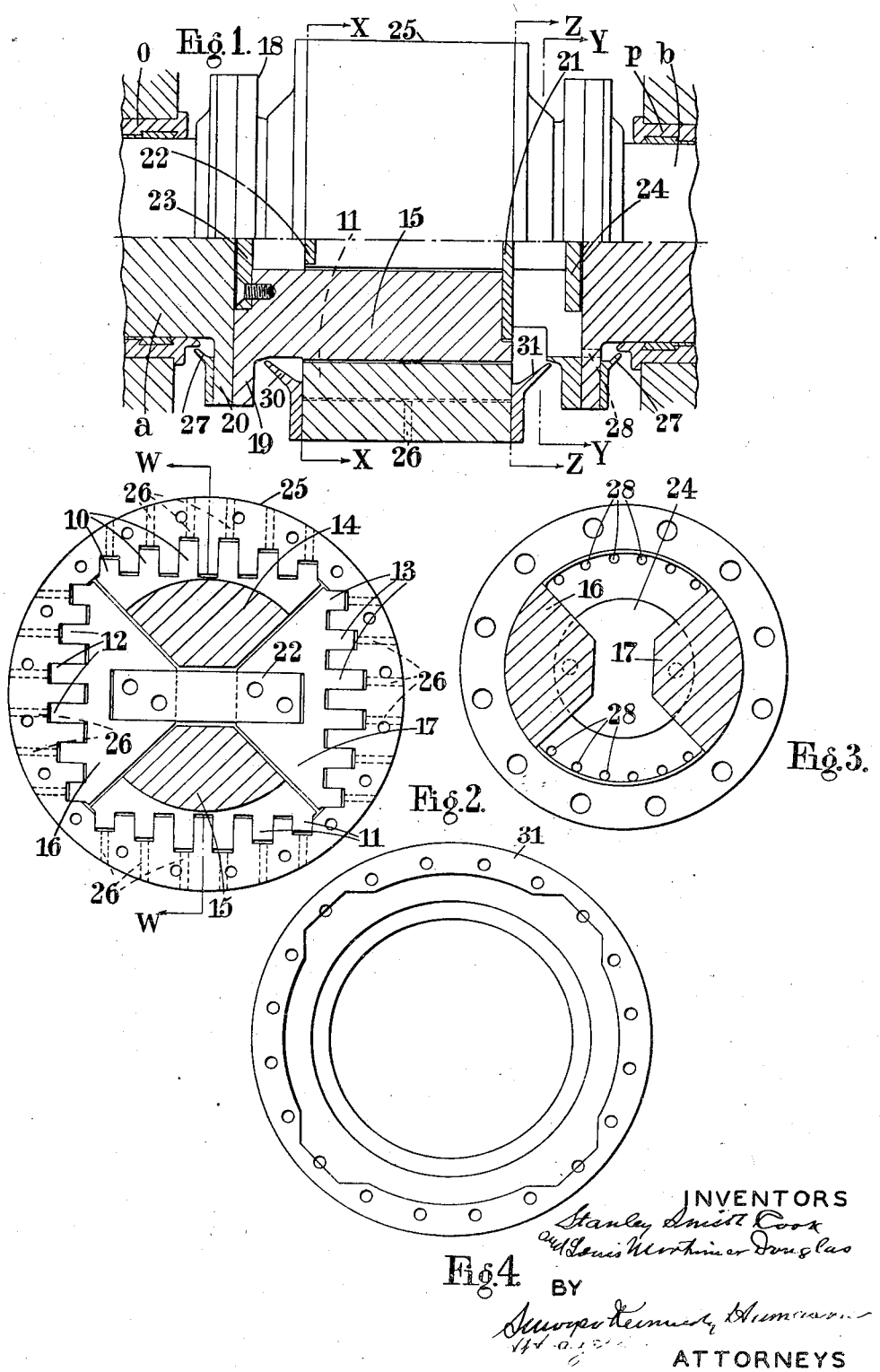
Figure 1 shows, as regards the upper half, an elevation of one arrangement of coupling embodying the present invention; this figure also shows, as regards the lower half, a section on the line W—W of Figure 2.
Figure 2 is a section on the line X—X of Figure 1.
Figure 3 is a section on the line Y—Y of Figure 1.
Figure 4 is a section on the line Z—Z of Figure 1.

In carrying the invention into effect according to one form illustrated in Figures 1 to 4, two sets of projections 10, 11 and 12, 13 are provided, these being co-lateral and occupying substantially the full length of the coupling.

The members 14, 15 carrying projections 10 and 11 respectively take the form in cross-section of two oppositely-disposed quadrants, each quadrant being integral with a semi-circular flange. These flanges 18, 19 are bolted to a flange 20 on the driving shaft $a$ and the quadrant members 14, 15 are interdisposed in relation to further members 16, 17 carrying the projections 12, 13. Members 16 and 17 are disposed, with relation to the driven shaft $b$, in the same way as members 14 and 15, with relation to the driving shaft $a$.

The open ends of the members 14, 15 are tied, in order to make the structure more rigid, by means of a strap or tie 21 whilst the open ends of the members 16, 17 are similarly tied by means of a strap or tie 22.

For simplicity in assembly and alignment ties 23 and 24 are provided at the flanged ends.

The projections engage notches formed in an annular member 25 each notch having a hole 26 for enabling discharge of oil to take place.

The size, number and disposition of the drain holes 26 may be varied to suit conditions of operation.

Oil is conveyed to the interior of the annular member 25 by way of flanged members 27 which receive oil from the shaft bearings $o$ and $p$ and feed the oil through holes 28 to further flanged members 30, 31 bolted to the ends of the member 25.

Couplings as described above are capable of transmitting torque of considerable magnitude between the driving and driven elements while providing longitudinal freedom between them and also a certain degree of freedom of angular movement in any plane passing through their axes.

The precise form of the structural details of the coupling above described may be varied without exceeding the scope of the invention.

We claim:

A mechanical coupling comprising an open ended driving member, a set of projections thereon, an open ended driven member, a set of projections thereon disposed in a plane at right angles to the plane containing the other set, said driving members and driven members being mutually interdisposed, an encircling member for said driving and driven members, internal grooves on said encircling member co-acting with said sets of projections and ties between the open ends of said driving and driven members.

STANLEY SMITH COOK.
LOUIS MORTIMER DOUGLAS.